Patented June 29, 1948

2,444,024

UNITED STATES PATENT OFFICE 2,444,024

6-CYCLOALKYLMETHYL-2-THIOURACILS

Sydney Archer, Albany, N. Y., assignor to Sterling Drug Inc., Wilmington, Del., a corporation of Delaware No Drawing. Application July 30, 1946,
Serial No. 687,207

4 Claims. (Cl. 260—260)

This invention relates to 6-substituted thiouracil compounds.

Thiouracil (2-mercapto-4-hydroxypyrimidine) and some of its simpler substitution derivatives have been found to have varied uses in industry and medicine. For example, thiouracil, 6-methyl-2-thiouracil, and their derivatives have been used as agents for stabilizing photographic emulsions (British Patent 452,043). Again, there is considerable information in the literature since 1943 regarding the efficacy of thiouracil as an antithyroid agent. Use of thiouracils as intermediates in organic syntheses is exemplified in the preparation of the pyrimidine analog of thiamin bromide by Elderfield et al. (J. Org. Chem. 7, 309 (1942)), as well as by the oxidation of 6-methyl-2-thiouracil with hydrogen peroxide to yield 4-hydroxy-6-methyl-pyrimidine (R. Williams et al., J. Am. Chem. Soc. 59, 528 (1937)). While thiouracil and its heretofore known substitution derivatives have been quite valuable in the various uses described above, there is always a place and need for more efficacious thiouracils. I have now found a series of such compounds that show considerable promise of replacing the known thiouracils in some of the various applications described above.

My invention relates to 2-thiouracil compounds substituted in the 6-position by a cycloalkylmethyl group of 4–7 carbon atoms. In these new compounds the cycloalkylmethyl group is attached to the thiouracil nucleus by a direct linkage from the methyl carbon atom of the cycloalkylmethyl radical. The cycloalkylmethyl group can be substituted at one or more of the ring carbon atoms by a lower alkyl group, provided the total number of carbon atoms in the ring and substituents (including said methyl carbon atom) together does not exceed 7; such cycloalkylmethyl groups include the following: cyclopropylmethyl, 2-methylcyclopropylmethyl, 2,2-dimethylcyclopropylmethyl, 2,3-dimethylcyclopropylmethyl, 2-ethylcyclopropylmethyl, 2-n-propylcyclopropylmethyl, cyclobutylmethyl, 2-methylcyclobutylmethyl, 3-methylcyclobutylmethyl, 2,3-dimethylcyclobutylmethyl, 2-ethylcyclobutylmethyl, cyclopentylmethyl, 2-methylcyclopentylmethyl, 3-methylcyclopentylmethyl, cyclohexylmethyl, and other similar groups.

The compounds of my invention are prepared by the condensation of the appropriate gamma-cycloalkyl-beta-oxobutyric acid ester with thiourea in the presence of a strong base as a condensing agent. For example, 6-cyclopropylmethyl-2-thiouracil is formed by the condensation of ethyl gamma-cyclopropyl-beta-oxobutyrate with thiourea in the presence of an alkali metal alkoxide such as sodium ethoxide. The cycloalkyloxobutyric acid esters can be prepared by any one of several methods which include: (1) condensation of a cycloalkylacetyl halide with ethyl acetoacetate, followed by removal of the acetyl group from the resulting acrylated oxo ester; and (2) reaction of a cycloalkylacetyl halide with malonic ester to yield a substituted malonic ester which can be decarbethoxylated to give the gamma-cycloalkyl-beta-oxobutyric acid ester.

The following examples illustrate specific embodiments of my invention; however it is to be understood that the invention is not limited to these examples but only by the scope of the appended claims.

Example 1

(a) *Cyclohexylacetyl chloride.*—284 g. of cyclohexylacetic acid is refluxed with 290 ml. of thionyl chloride for 7 hours; the excess thionyl chloride is removed at atmospheric pressure; and the resulting residue is distilled in vacuo yielding about 29 g. of cyclohexylacetyl chloride, B. P. 71.5–73° C. at 9 mm.

(b) *Ethyl gamma-cyclohexyl-beta-oxobutyrate.*—To 23 g. of powdered sodium metal in about 400 ml. of dry ether is added dropwise with stirring 130.1 g. of ethyl acetoacetate. After standing overnight, this mixture is treated with a solution of 160.5 g. of cyclohexylacetyl chloride in 100 ml. of dry ether added dropwise, and the resulting mixture is refluxed gently for 5 hours, cooled and treated with enough water to produce a clear solution which is extracted 3 times with ether. The combined ether extracts are cooled to 10° C. and gaseous ammonia is bubbled therein for a period of about 2½ hours. It is washed with water; stirred vigorously with 240 ml. of 10% hydrochloric acid for 2–3 hours; separated therefrom; washed with water, dilute sodium bicarbonate solution, and again with water; and dried over anhydrous sodium sulfate. After removal of the ether by distillation, the residue is treated with petroleum ether to separate the product from cyclohexylacetamide which is formed as a by-product during the ammonia treatment. The amide is filtered off and the petroleum ether solution distilled in vacuo yielding about 29 g. of ethyl gamma-cyclohexyl-beta-oxobutyrate, B. P. 143–5° C. at 12 mm.

(c) *6-cyclohexylmethyl-2-thiouracil.*—A 4.6 g. portion of sodium is dissolved in 100 ml. of anhydrous ethanol and 10.7 g. of thiourea added thereto. After complete dissolution of the thiourea, 21.2 g. of ethyl gamma-cyclohexyl-beta-oxobutyrate is added and the mixture refluxed for 7 hours during which period a precipitate forms. After removal of most of the alcohol by distillation in vacuo, the remainder of the reaction mixture is dissolved in about 500 ml. of water and made acid to Congo red with concentrated hydrochloric acid to precipitate the crude product which is filtered off, recrystallized twice from acetic acid-water with charcoaling and once from 95% ethanol to yield about 9 g. of 6-cyclohexylmethyl-2-thiouracil, M. P. 238–240° C. (in vacuo).

The above general method can also be used to prepare 6-cyclopropylmethyl-2-thiouracil, 6-cyclobutylmethyl-2-thiouracil, and 6-cyclopentylmethyl-2-thiouracil, as well as their analogs having a lower alkyl group linked to one or more carbon atoms of the cycloalkyl ring.

Example 2

(a) *Ethyl cyclopentylidenecyanoacetate.*—In a flask equipped with a water separator is placed 56.5 g. of ethyl cyanoacetate, 50.5 g. of cyclopentanone (prepared according to Gilman-Blatt, "Organic Syntheses, Collective Volume I," p. 192, John Wiley and Sons, Inc., New York, N. Y.), 3.85 g. of ammonium acetate, 6.0 g. of acetic acid and 50 ml. of dry benzene. The mixture is refluxed one hour longer than is necessary for the theoretical amount of water to come off (about 3½ hours), cooled, and extracted with ether. After the ether extract has been washed with water and dried over anhydrous sodium sulfate, the ether is removed by distillation and the residue distilled in vacuo to yield about 72 g. of ethyl cyclopentylidene-cyanoacetate, B. P. 152–6° C. at 18 mm. This compound is a white solid melting at 47–52° C.; recrystallization from the ether-petroleum ether yields about 64 g. of product which is used in Example 2—b. The purified product melts at 55–7° C.

(b) *Ethyl cyclopentylcyanoacetate.*—17.9 g. of ethyl cyclopentylidenecyanoacetate in 100 ml. of methanol is catalytically reduced under a pressure of 40 lbs. of hydrogen at room temperature in the presence of 0.2 g. of platinum oxide. After filtering off the catalyst and removing the solvent by distillation in vacuo, the residue is distilled in vacuo giving a main fraction of ethyl cyclopentylcyanoacetate, B. P. 135–8° C. at 17 mm. (bath temperature at 160–170° C.) and $N_D^{28}$ 1.4535.

(c) *Cyclopentylacetic acid.*—To a refluxing solution of 110 g. of potassium hydroxide in 130 ml. of water is added slowly 81 g. of ethyl cyclopentylcyanoacetate; and the mixture is refluxed for 6 hours; cooled, and acidified with concentrated hydrochloric acid. The acidified solution is extracted with ether; the ether extract is washed with water and dried over anhydrous sodium sulfate; the ether is removed; and the resulting residue is distilled in vacuo yielding about 47 g. of cyclopentylacetic acid, B. P. 135–7° C. at 27 mm. and $N_D^{28}$ 1.4506.

(d) *Cyclopentylacetyl chloride.*—The same general procedure as described in Example 1—a is used, but using 63 g. of cyclopentylacetic acid and 142.6 g. of thionyl chloride, with a reflux period of 4 hours. The product, cyclopentylacetyl chloride, distills at 80–2° C. at 26 mm.; the weight is about 66 g.

(e) *Ethyl gamma-cyclopentyl-beta-oxobutyrate.*—The same general procedure is used as described in Example 1—b, but using the following reactants:

| | |
|---|---:|
| Powdered sodium in 200 ml. of dry ether grams | 10.3 |
| Ethyl acetoacetate milliliters | 57.5 |
| Cyclopentylacetyl chloride in 50 ml. of dry ether grams | 65.8 |
| 10% hydrochloric acid milliliters | 200 |

The crude product redistills at 100–2° C. at 1.1 mm. to give about 25 g. of ethyl gamma-cyclopentyl-beta-oxobutyrate, $n_D^{28}$ 1.4550.

(f) *6 - cyclopentylmethyl-2-thiouracil.* — This preparation is carried out as in Example 1—c, but using

| | Grams |
|---|---:|
| Sodium in 121 ml. of absolute ethanol | 5.6 |
| Thiourea | 12.85 |
| Ethyl gamma-cyclopentyl-beta-oxobutyrate | 24 | and a reflux period of 8 hours. About 17 g. of 6-cyclopentylmethyl-2-thiouracil, M. P. 208° C. (dec.), is obtained.

Being acidic in nature, the compounds of my invention can be readily converted into salts by treatment with appropriate bases, e. g. alkali metal hydroxides, alkaline earth hydroxides, ammonia, or other bases, and therefore are useful either as free acids or in the form of said salts, e. g. the sodium, potassium, calcium, ammonium, or other salts. It will therefore be understood that the appended claims comprehend not only the free acid form of the 6-cycloalkylmethyl-2-thiouracils, but also the salts thereof.

I claim:
1. A thiouracil substituted in the 6-position by a cycloalkylmethyl group of 4–7 carbon atoms.
2. 6-cyclohexylmethyl-2-thiouracil.
3. 6-cyclopentylmethyl-2-thiouracil.
4. 6-cyclopropylmethyl-2-thiouracil.

SYDNEY ARCHER.

REFERENCES CITED

The following references are of record in the file of this patent:

Organic Chemistry, by Fieser and Fieser, 1944 edition, D. C. Heath and Co., Boston, pp. 49–50 and 297.

Textbook of Organic Chemistry, by George Holmes Richter, 1938 edition, Wiley, page 17.

Jour. Chem. Soc. (1935), 1283–4.

Jour. Amer. Chem. Soc. 36, 1891–9.

Certificate of Correction

Patent No. 2,444,024.  June 29, 1948.

SYDNEY ARCHER

It is hereby certified that errors appear in the printed specification of the above numbered patent requiring correction as follows: Column 2, line 8, for "acrylated" read *acylated*; line 25, for "about 29 g." read *about 296 g.*; and that the said Letters Patent should be read with these corrections therein that the same may conform to the record of the case in the Patent Office.

Signed and sealed this 23rd day of November, A. D. 1948.

[SEAL]

THOMAS F. MURPHY,
*Assistant Commissioner of Patents.*